United States Patent [19]

Pinto

[11] Patent Number: 4,981,669

[45] Date of Patent: Jan. 1, 1991

[54] AMMONIA SYNTHESIS GAS

[75] Inventor: Alwyn Pinto, Middlesbrough, England

[73] Assignee: Imperial Chemical Industries PLC, London, England

[21] Appl. No.: 253,505

[22] Filed: Oct. 5, 1988

[30] Foreign Application Priority Data

Oct. 19, 1987 [GB] United Kingdom ................ 8724474

[51] Int. Cl.$^5$ ................................................ C01C 1/04
[52] U.S. Cl. ..................................... 423/359; 252/376
[58] Field of Search ........................... 423/359; 252/376

[56] References Cited

U.S. PATENT DOCUMENTS 4,298,588 11/1981 Pinto .................................... 423/359
4,479,925 10/1984 Shires et al. ......................... 423/359

FOREIGN PATENT DOCUMENTS 2085314 9/1981 United Kingdom.
2126573 9/1983 United Kingdom.

Primary Examiner—Wayne A. Langel
Attorney, Agent, or Firm—Cushman, Darby & Cushman

[57] ABSTRACT

Ammonia synthesis gas is prepared by primary and secondary reforming followed by shift and carbon oxides removal. So that the process can use naphtha and methane, e.g. natural gas, as alternative feedstocks, at least the initial part of the primary reforming catalyst is alkalized. When using a methane feedstock, the primary reformer heating and outlet temperature are reduced compared to when using naphtha, and the amount of air fed to the secondary reformer is increased, so that, after shift, the hydrogen to nitrogen molar ratio of the gas stream is lower and is such that the gas contains an excess of nitrogen. This excess of nitrogen is subsequently removed, e.g. from the ammonia synthesis loop by a cryogenic hydrogen-recovery unit treating a loop purge stream and recovering hydrogen for recycle to the loop.

10 Claims, No Drawings

AMMONIA SYNTHESIS GAS

This invention relates to the production of ammonia synthesis gas.

Ammonia synthesis gas, i.e. a mixture of hydrogen and nitrogen, usually together with gases such as argon and methane that are inert in the ammonia synthesis process, is normally made by a sequence of steps including:

(a) primary catalytic steam reforming of a hydrocarbon feedstock by passing a mixture of the feedstock and steam over a steam reforming catalyst disposed in externally heated tubes whereby a primary reformed gas stream comprising hydrogen, carbon oxides, methane, and unreacted steam is produced;

(b) secondary steam reforming wherein the primary reformed gas stream, optionally together with an additional amount of feedstock and/or steam, is partially combusted with air (by which term we include oxygen-enriched air unless the context otherwise indicates), and the resultant hot gas mixture is passed over a steam reforming catalyst under substantially adiabatic conditions to bring the mixture towards equilibrium, thereby producing a secondary reformed gas stream containing hydrogen, carbon oxides, nitrogen, a decreased quantity of methane, and, generally, inert gases such as argon together with unreacted steam;

(c) one or more stages of catalytic shift reaction wherein the secondary reformed gas stream, optionally together with a further quantity of steam, is passed over a shift catalyst to convert carbon monoxide to carbon dioxide with the consequent production of a mole of hydrogen for each mole of carbon monoxide converted; and removal of the carbon oxides and unreacted steam.

The removal of the carbon oxides is generally effected in two or more stages. Thus, after shift, the gas streamm may be subjected to a "wet" carbon dioxide removal process wherein the carbon dioxide is removed by absorption by a suitable liquid, e.g. a solution of potassium carbonate or an amine such as an alkanolamine, or by a "dry" process, such as a pressure swing adsorption process, wherein the carbon dixoide is adsorbed from the gas stream by a suitable adsorbent, e.g. a zeolite or active carbon. The residual carbon monoxide (which may be at least partially removed in such a "dry" adsorption process), together with any residual carbon dioxide, is removed by subjecting the gas stream to methanation wherein the carbon oxides are reacted with some of the hydrogen present producing methane and water. Before use for ammonia synthesis the gas is cooled to condense water which is then separated and then the gas is dried further if necessary.

The resulting ammonia synthesis gas is normally converted to ammonia in a synthesis loop to which the fresh synthesis gas, hereinafter termed make-up gas, if fed and from which a purge stream is taken to avoid a build-up of inerts.

For ammonia synthesis the stoichiometric hydrogen to nitrogen molar ratio is 3. Normally the amount of air employed in the secondary reforming step is such that the amount of nitrogen introduced is such that the make-up gas produced by the above sequence of steps has a hydrogen to nitrogen molar ratio of about 3, although processes are known, for example from "Nitrogen" 102 July/August 1976 pages 35-39, wherein a small excess of air is employed so that the make-up gas has a hydrogen to nitrogen molar ratio somewhat less than 3, usually in the range 2.7 to 2.85, and a hydrogen recovery unit is provided to recover hydrogen from the purge stream from the ammonia synthesis loop and this recovered hydrogen is recycled.

Most processes for the production of ammonia synthesis gas are tailored to operate with a particular hydrocarbon feedstock, e.g. a methane or naphtha feedsatock. By the term methane feedstock we mean hydrocarbon feedstocks containing at least 50 mole % of methane and include natural gas which may contain a proportion of higher, e.g. $C_2$ to $C_4$, hydrocarbons. Alternatively methane obtained from another source may be used. By the term naphtha feedstock we mean a hydrocarbon feedstock consisting primarily of hydrocarbons containing more than one carbon atom, generally at least 4 carbon atoms, and having an atmospheric pressure final boiling point of up to 220° C. The process conditions and catalysts employed, particularly in the primary steam reforming stage, are designed for use with one feedstock and will not generally give optimum results with an alternative feedstock. For primary steam reforming of naphtha, to avoid carbon laydown on the catalyst, an alkalised catalyst is required, at least in the inlet part of the reforming tubes. When primary steam reforming a methane feedstock, more efficient, alkali-free, catalysts can be used.

However it is desirable to provide a versatile process wherein the feedstock can be varied, and indeed catalysts suitable for use in such processes have been described in, for example, GB-A-2085314.

When primary steam reforming a naptha feedstock, in addition to using an alkalised catalyst, it is necessary to employ a high primary reformer outlet temperature, typically in the range 780°-830° C., e.g. about 800° C., in order to achieve adequate reforming of the higher hydrocarbons. Alternatively an unacceptably large volume of primary reforming catalyst is required.

The primary reformer outlet temperature also determines, under given conditions of pressure, steam ratio (i.e. moles of steam per gram atom of carbon in the feedstock), reformer design etc., the methane content of the primary reformed gas stream. In such a naptha steam reforming process the maximum temperature of the reformer tubes is usually at, or near, the tube exit and so is normally no more than about 20°-40° C. above the primary reformer outlet temperature. To obtain an acceptable tube life, the maximum temperature to which the tubes are subject is desirably as low as possible.

If, however, a methane feedstock is primary steam reformed under the same conditions, i.e. using an alkalised catalyst at the same exit temperature and using the same steam ratio, there is a serious risk that the reformer tubes will overheat as the maximum tube temperature will normally occur part way along the reformer tubes and will be well above the reformer outlet temperature. To decrease the maximum tube temperature to an acceptable level, it is therefore necessary to decrease the amount of heating of the reformer tubes and so reduce the reformer outlet temperature with a consequent increase in the methane content of the primary reformed gas stream. It is possible to decrease the proportion of unreacted methane in the primary reformed gas stream, i.e. to compensate for the reduction in the primary reformer outlet temperature, by increasing the steam ratio: however a sufficient increase in the steam ratio to compensate wholly for the lower reformer outlet temperature is disadvantageous on economic grounds. Indeed it usually be desirable on economic grounds to employ a lower steam ratio.

It would be possible to over-design the primary reformer, i.e. provide sufficient volume of catalyst, so that the heat flux is reduced to a level that, when using a methane feedstock, problems of excessively high tube temperatures are not encountered. However such over-design is unacceptable on economic grounds. Excessive tube temperatures could aslo be avoided, when using a methane feedstock, by reducing the amount of heating and the throughput of the reformer; however the degree of reduction of throughput necessary is such that the amount of synthesis gas produced as a result would be much less than when using naphtha as the feedstock. Consequently the amount of ammonia that could be produced would be significantly reduced; again this would be unacceptable on economic grounds. It is desirable to produce, from either feedstock, essentially the same amount of ammonia without the use of excessive amounts of primary reforming catalyst.

In the present invention, when reforming a methane feedstock, compensation for the increased proportion of unreacted methane in the primary reformed gas stream resulting from the need to operate at a lower reformer outlet temperature is provided by increasing the proportion of air employed in the secondary reforming stage. This results in a decrease in the hydrogen to nitrogen ratio of the synthesis gas and so, at a suitable stage, the resultant excess of nitrogen is removed.

Processes have been proposed, for example in U.S. Pat. Nos. 3,442,613, 4,298,855, and 4,695,442, wherein the amount of air employed in the secondary reforming step is such that the amount of nitrogen introduced into the gas stream is in an excess of that required for ammonia synthesis. These references are primarily concerned with processes using a methane feedstock. Although they mention the possibility of the application of the processes to feedstocks such as naphtha, often there is little advantage in applying these processes to naphtha as the advantage of the use of an excess of air is to decrease the primary reformer duty: with naphtha as the feedstock, because of the need for a high primary reformer outlet temperature, there is little scope for decreasing the primary reforming duty. In the processes of those references, this excess of nitrogen is removed from the gas stream at a suitable stage after the shift stage, e.g. cryogenically before ammonia synthesis in U.S. Pat. No. 3,442,316; together with the carbon dioxide by a pressure swing adsorption process in U.S. Pat. No. 4,695,442; or in U.S. Pat. No. 4,298,588, cryogenically from a purge stream from the ammonia synthesis loop with recycle to the loop of a hydrogen-enriched stream, so that the ammonia synthesis gas comprises a mixture of the make-up gas together with the hydrogen-enriched gas stream.

In the present invention, at least when using a methane feedstock, the amount of air employed in the secondary reforming stage is such that the amount of nitrogen introduced is in an excess of that required for ammonia synthesis and this excess of nitrogen is removed at a suitable stage.

Accordingly the present invention provides a process for the production of ammonia synthesis gas from a methane feedstock in a plant that also capable of operating using a naphtha feedstock, said process comprising:

(a) primary catalytic steam reforming of the feedstock by passing the feedstock and steam over a steam reforming catalyst suitable for the reforming of naphtha disposed in externally heated tubes, the catalyst in at least the inlet part of the tubes being alkalised, whereby a primary reformed gas stream comprising hydrogen, carbon oxides, methane, and unreacted steam, is produced;

the amount of external heating of the reformer tubes being less than when using said naphtha feedstock so that the primary reformer exit temperature is lower than when using said naphtha feedstock;

(b) secondary steam reforming wherein the primary reformed gas stream, optionally together with an additional amount of feedstock and/or steam, is partially combusted with air and the resultant hot gas mixture is passed over a secondary steam reforming catalyst under substantially adiabatic conditions to bring the mixture towards equilibrium, thereby producing a secondary reformed gas stream containing hydrogen, carbon oxides, nitrogen, a decreased quantity of methane, argon, and unreacted steam;

(c) one or more stages of catalytic shift reaction wherein the secondary reformed gas stream, optionally together with a further quantity of steam, is passed over a shift catalyst to convert carbon monoxide to carbon dioxide with the consequent production of a mole of hydrogen for each mole of carbon monoxide converted;

the proportion of air, expressed as moles of air per gram atom of carbon in the feedstock, fed to the secondary reformer being greater than when using said naphtha feedstock, whereby the amount of nitrogen introduced is such that the hydrogen to nitrogen molar ratio of the shifted gas stream is lower than when using said naphtha feedstock and said amount of nitrogen is in an excess of that required for ammonia synthesis;

(d) removal of the carbon oxides and unreacted steam; and (e) separating the excess of nitrogen after the shift stage.

It is an important feature of the present invention that the primary reforming catalyst employed is a catalyst suitable for reforming naphtha: to this end the catalyst in at least the inlet part of the reformer tubes, e.g. for at least the initial 30%, particularly the initial 50-80%, of the tube length, is an alkalised catalyst. For the remainder of the tube length an unalkalised naphtha steam reforming catalyst may be employed. Any of the primary reforming catalysts conventionally employed for steam reforming of naphtha may be employed. They usually comprise nickel, alone or in combination with other metals such as cobalt, supported on a suitable refractory support, e.g. rings of alumina or calcium aluminate cement. In the alkalised catalyst, the alkali component is usually potassium, normally as an aluminate. Suitable alkalised catalysts are described in GB-A-1003702. Alternatively the catalysts described in GB-A-2085314 and described as being suitable for both naphtha and methane steam reforming may be employed. A particularly useful combination is ICI Catalyst 46-1 as the alkalised catalyst and ICI Catalyst 46-4 as an unalkalised catalyst.

Unless a sulphur resistant catalyst is employed, the feedstock should be desulphurised prior to reforming. This may be accomplished in the normal manner.

In the present invention, the amount of external heating of the primary reformer is reduced when reforming a methane feedstock compared to reforming naphtha. The amount of heating referred to here is the total amount of heat supplied.

When reforming naphtha, the design primary reformer outlet temperature will generally be in the range 780°–830° C.: when reforming a methane feedstock, the outlet temperature is reduced from the naphtha design outlet temperature by 10°–50° C., particularly 15°–30° C. The reformer outlet temperature when reforming naphtha, is preferably such that the design methane content of the primary reformed gas has a value, $M_1$, which is the range 5–15% v/v (on a dry basis). When reforming a methane feedstock, the primary reforming conditions are preferably such that the methane content of the primary reformed gas has a value $M_2$ which is in the range 10–20%, and is at least $(M_1+2)$ %, v/v on a dry basis.

The reforming may be effected at any suitable pressure, and is preferably in the range 5 to 50 bar abs. especially 10 to 40 bar abs.

The steam ratio, i.e. moles of steam per gram atom of carbon in the feedstock, in the primary reforming step is preferably in the range 2.5 to 6. However when reforming naphtha it is generally necessary to employ a steam ratio of at least 3, and often in an excess of 3.5, in order to avoid problems of carbon deposition. When using a methane feedstock it is possible to employ stem ratios lower than that employed with naphtha, although as explained hereinafter it could be advantageous to use an increased steam ratio. It is preferred however that the steam ratio when reforming a methane feedstock is not more than 10% above, and in particular is below, but most preferably not more than 30% below, the steam ratio employed when the feedstock is naphtha.

The secondary reforming operation may be conducted using air, or oxygen-enriched air. Preferably air is used as this avoids the need for an air enrichment plant. The amount of air employed when the feedstock to the primary reformer is naphtha will depend on the design methane content of the secondary reformed gas stream, the design primary reforming conditions, e.g. pressure, steam ratio, and outlet temperature, and the design hydrogen to nitrogen ratio of the gas after the shift stage or stages. The design methane content of the secondary reformed gas is preferably less than 1.5% v/v, particularly between 0.2 and 1% v/v (on a dry basis). The amount of air employed is preferably such that the hydrogen to nitrogen molar ratio of the gas, after shift, is in the range 2.2 to 2.7 when using a methane feedstock and in the range 2.4 to 2.9 when the feedstock is naphtha.

In order to produce the same amount of hydrogen after shift (assuming that the shift is effected to convert essentially all the carbon monoxide present), even though more air is employed in the secondary reforming stage, when using a methane feedstock, the amount of feedstock, expressed in gram atoms of feedstock carbon, that is required is less than when using a naphtha feedstock. This means that, at the same steam ratio, to produce a given amount of hydrogen after shift, the throughput of the primary reformer is less when using a methane feedstock. One consequence is that it is therefore possible, if an adequate supply of steam is available, to increase the steam ratio when reforming a methane feedstock. An increase in the steam ratio has the effect that the methane content of the primary reformed gas is decreased, therefore decreasing the amount of additional air required in the secondary reforming stage. The decreased throughput of the primary reformer when reforming a methane feedstock however has other benefits that may well be more advantageous than increasing the steam ratio and decreasing the amount of additional air required in the secondary reforming stage. Thus the decreased throughput of the primary reformer has the advantage that the pressure drop that occurs in the primary reformer is decreased: hence the primary reformer exit pressure can be higher when reforming a methane feedstock. Although the amount of air employed in the secondary reforming stage is increased, the throughput in the secondary reforming and subsequent shift and carbon oxides removal stages is also decreased, compared to the case when the feedstock is naphtha. This means that the pressure drop in those stages will also be decreased. Consequently the pressure at the inlet of the compressor compressing the make-up gas to the synthesis pressure is higher than when the feedstock is naphtha. Although in the preferred form of the process the excess of nitrogen introduced in the secondary reforming stage is not removed until after such compression and so the amount of gas that has to be compressed is greater when using a methane feedstock, the increase in the compressor inlet pressure resulting from the decreased throughput in the reforming stages partially offsets the additional power required to effect the compression of this excess of nitrogen to the synthesis pressure.

As indicated above, it is possible to effect the reforming stages when using a methane feedstock at a lower stream ratio than when using naphtha: the use of a lower steam ratio further reduces the throughput in the reforming and shift stages and so increases this pressure drop advantage. For this and other economic reasons, it is generally preferable, when using natural gas as the feedstock, to decrease the steam ratio, particularly by 10–30% from that employed when reforming naphtha.

The shift and carbon oxides removal stages will generally be operated under similar conditions irrespective of the feedstock, although of course as described herein the gas composition of the feed to the shift and carbon oxides removal stages will differ depending on the feedstock. The shift stage (or stages) is preferably such as to give a shifted gas containing less than 1%, particularly less than 0.5%, v/v carbon monoxide (on a dry basis). Likewise the carbon dioxide removal stage is preferably operated to give a gas stream containing less than 1%, particularly less than 0.5%, v/v carbon dioxide (on a dry basis). Such shift and carbon dioxide removal processes are well known. As a result of efficient shift and carbon dioxide removal, the amount of carbon oxides that have to be removed by methanation is relatively small and so little of the hydrogen in the gas stream has to be consumed to effect such methanation.

As mentioned above, it is necessary to remove any excess of nitrogen introduced in the secondary reforming stage. While in some cases this excess of nitrogen may be removed, as in the processes described in the aforesaid U.S. Pat. Nos. 3,442,613 and 4,695,442, prior to addition of the make-up gas to the ammonia synthesis loop, it is generally more convenient to adopt the procedure described in U.S. Pat. No. 4,298,588 wherein the make-up gas is fed to an ammonia synthesis loop wherein ammonia is synthesised and separated from unreacted gas which, apart for a purge stream, is returned to the synthesis. At least when using a methane feedstock, the purge stream is subjected to a hydrogen-recovery process to separate said purge stream into a hydrogen-enriched stream which is returned to the synthesis and a waste gas stream; at least when said feedstock is natural gas, the hydrogen recovery process effects the separation of the excess of nitrogen which is removed from the synthesis loop as part of said waste gas stream. So that a high (e.g. 97-98%) hydrogen usage efficiency, i.e. the proportion of the hydrogen in the make-up gas fed to the synthesis loop that is converted to ammonia, can also be achieved when using naphtha as the feedstock, the hydrogen recovery unit is preferably also employed when the feedstock is naphtha. Since the hydrogen recovery unit has to separate the purge stream into a hydrogen-enriched stream that is recycled and a waste gas stream containing the inerts, it is usually necessary, in order that the waste gas stream contains the desired amount of inerts but only little hydrogen, that an appreciable amount of nitrogen has to be separated into the waste gas stream. For this reason, where such hydrogen recovery unit is employed when the feedstock is naphtha as well as when using a methane feedstock, the make-up gas fed to the synthesis loop should contain an excess of nitrogen. Hence even when the feedstock is naphtha, the amount of air employed in the secondary reforming stage is such that an excess of nitrogen is introduced. However the amount of air that is required when the feedstock is naptha is less than that required when using a methane feedstock. When the feedstock is naptha, the amount of air employed is preferably such that the fresh synthesis gas has a hydrogen to nitrogen molar ratio, after shift, significantly below 3, e.g. in the range 2.4 to 2.85.

The appropriate amount of nitrogen, together with inerts, can be removed by adjusting the flow rate of gas fed to the hydrogen recovery unit and the operating conditions thereof. To facilitate removal of the nitrogen excess when using a methane feedstock it may be desirable to operate the synthesis loop at a lower hydrogen to nitrogen ratio than when using a naphtha feedstock. Thus, when using a naphtha feedstock, the synthesis gas entering the synthesis catalyst may have a hydrogen to nitrogen molar ratio approximately stoichiometric for ammonia synthesis, i.e. at a value of 3, but, when using a methane feedstock, it may be desirable to modify the hydrogen to nitrogen ratio of the synthesis gas entering the synthesis reactor, by adjusting the amount of nitrogen separated in the hydrogen recovery unit, to a value substantially below that employed when using a naphtha feedstock, e.g. to a value in the range 1.8 to 2.5. It is preferred that, when using a methane feedstock, the hydrogen to nitrogen molar ratio of the synthesis gas entering the synthesis catalyst is at least 0.3 below than that employed when using a naphtha feedstock.

The present invention thus enables the plant to be operated, to produce the same amount of ammonia, with a naphtha feedstock and then changed to operation on a methane feedstock simply by varying the composition of the feed, preferably gradually so that the plant is operated for a period of time on a mixture of naphtha and methane feedstocks with a gradually decreasing proportion of naphtha, with the primary reformer heating, throughput, and outlet temperature being reduced; and the amount of air introduced, and the amount of nitrogen separated, being increased in step with, but not necessarily simultaneously with, the change in the feedstock composition. Likewise the change can be reversed from operation on a methane feedstock to operation or naphtha. In this way versatility of the plant can be achieved to allow the operator to alternate between feedstocks depending on their availability and/or prices.

One consequence of the change in feedstock is that in addition to variations in the amount of nitrogen that has to be separated, the amount of carbon dioxide that has to be removed will vary. To a large extent these will compensate for one another: thus the amount of carbon dioxide that has to be removed decreases as the feedstock changes from a naphtha to a methane feedstock while the amount of nitrogen increases. One advantage of the present process, compared to processes wherein the amount of air employed in the secondary reforming stage is not increased when using a methane feedstock, is that the amount of carbon dioxide produced when using a methane feedstock is closer to that required for urea synthesis where the ammonia produced is employed for such manufacture.

Instead of changing the conditions so that the amount of ammonia synthesis gas produced is such as to produce the essentially the same amount of ammonia, it will be appreciated that, depending on the capacity of the plant downstream from the reforming stages, it may be possible, when operating with one feedstock to produce a larger quantity of ammonia than when operating on another feedstock. However it is preferred that the conditions employed are such that the amount of ammonia produced when using a methane feedstock is not less than 95%, and not more than 110%, of that produced when using a naphtha feedstock.

The invention is illustrated by the following calculated examples.

EXAMPLE 1

In this example of an ammonia synthesis gas production process using natural gas and naphtha as alternative feedstocks and employing the sequence of primary and secondary reforming followed by shift, the primary reforming stage employs a standard alkalised naphtha steam reforming catalyst (ICI Catalyst 46-1) in the initial 50% of the length of the primary reformer tubes and standard unalkalised naphtha steam reforming catalyst (ICI Catalyst 46-4) for the remainder of the length of the tubes with an outlet reforming pressure of about 34 bar abs.

The example has been simplified by omitting argon and also the usual minor components of the primary reformer feed (such as hydrogen resulting from the use of an excess of hydrogen in a hydrodesulphurisation step), and the small amounts of hydrocarbons containing more than 1 carbon atom, carbon dioxide, and nitrogen which are often present in a methane feedstock such as natural gas. Also for simplicity it is assumed that all the carbon monoxide will be converted to carbon dioxide in the shift stage and that all the carbon dioxide is removed without the need for methanation.

Assuming a hydrogen usage efficiency of 100%, the amount of make-up gas produced is such as to produce about 1400 te/day ammonia.

Three cases are illustrated:
(A) use of a naphtha feedstock;
(B) use of natural gas as the feedstock; and
(C) by way of comparison, use of natural gas as the feedstock without a decrease in the primary reformer outlet temperature and without the addition of a significant excess of nitrogen. In this case a slightly higher primary reformer outlet temperature is in fact required to achieve the desired secondary reformer outlet gas composition.

Case A

| Feedstock | Naptha ($CH_x$ — where $x = 2.15$) | |
|---|---|---|
| Primary reformer | Outlet temperature | 800° C. |
| | Max. tube wall temperature | 832° C. |
| | Heat load | 73510 te.cal/h |
| Secondary reformer | Outlet temperature | 941° C. |

Flow rates (kg mol/h)

| | $x$ | $CH_x$ | CO | $CO_2$ | $H_2$ | $O_2$ | $N_2$ | $H_2O$ |
|---|---|---|---|---|---|---|---|---|
| Pmy in | 2.15 | 2103 | | | | | | 6309 |
| Pmy out | 4 | 630 | 655 | 818 | 3295 | | | 4018 |
| Sec in | 4 | 630 | 655 | 818 | 3295 | 467 | 1755 | 4018 |
| Sec out | 4 | 68 | 1195 | 840 | 4071 | | 1755 | 4367 |

Hydrogen/nitrogen molar ratio of shifted gas: 3.0 Amount of nitrogen to be removed: 0 kg mol/h

Case B

| Feedstock | Natural gas ($CH_x$ — where $x = 4$) | |
|---|---|---|
| Primary reformer | Outlet temperature | 780° C. |
| | Max. tube wall temperature | 881° C. |
| | Heat load | 68830 te.cal/h |
| Secondary reformer | Outlet temperature | 951° C. |

Flow rates (kg mol/h)

| | $x$ | $CH_x$ | CO | $CO_2$ | $H_2$ | $O_2$ | $N_2$ | $H_2O$ |
|---|---|---|---|---|---|---|---|---|
| Pmy in | 4 | 1660 | | | | | | 4984 |
| Pmy out | 4 | 770 | 395 | 495 | 3165 | | | 3599 |
| Sec in | 4 | 770 | 395 | 495 | 3165 | 559 | 2103 | 3599 |
| Sec out | 4 | 64 | 1006 | 590 | 4260 | | 2103 | 3916 |

Hydrogen/nitrogen molar ratio of shifted gas: 2.5 Amount of nitrogen to be removed: 348 kg mol/h

Case C (comparative)

| Feedstock | Natural gas ($CH_x$ — where $x = 4$) | |
|---|---|---|
| Primary reformer | Outlet temperature | 807° C. |
| | Max. tube wall temperature | 932° C. |
| | Heat load | 74580 te.cal/h |
| Secondary reformer | Outlet temperature | 958° C. |

Flow rates (kg mol/h)

| | $x$ | $CH_x$ | CO | $CO_2$ | $H_2$ | $O_2$ | $N_2$ | $H_2O$ |
|---|---|---|---|---|---|---|---|---|
| Pmy in | 4 | 1617 | | | | | | 4850 |
| Pmy out | 4 | 645 | 487 | 485 | 3400 | | | 3396 |
| Sec in | 4 | 645 | 487 | 485 | 3400 | 469 | 1763 | 3396 |
| Sec out | 4 | 66 | 1005 | 546 | 4261 | | 1763 | 3691 |

Hydrogen/nitrogen molar ratio of shifted gas: 2.99 Amount of nitrogen to be removed: 8 kg mol/h It is seen from case C that if the primary reformer heating and hence exit temperature is not decreased when using a methane feedstock, an unacceptably high maximum tube wall temperature would be obtained. It is also seen, comparing cases A and B, that the change from a naphtha to a methane feedstock considerably reduces the primary reformer duty, resulting in a fuel saving of about 7%, and the decrease in carbon oxides in the secondary reformed gas stream more than compensates for the increase in the amount of nitrogen so that there is a slight decrease in the gas flow rate to the shift stage. On the other hand, if the excess of nitrogen is removed from the gas after such compression, e.g. by a hydrogen recovery unit treating a stream taken from the ammonia synthesis loop as described in U.S. Pat. No. 4,298,588, an extra 5% by volume of gas has to be compressed the synthesis loop pressure.

In the above example it is seen that one consequence of the change from a naphtha to a methane feedstock is that the primary reformer volumetric throughput is decreased by about 10% (on a wet basis). This has the effect that, if the primary reformer inlet pressure is the same in both cases A and B, there will be a lower pressure drop in the primary reformer when reforming a methane feedstock; hence the primary reformer outlet pressure will be greater. Since the volumetric throughput in the secondary reforming stage in case B is also slightly lower, despite the use of a larger quantity of air, the secondary reformer outlet pressure will be greater when reforming a methane feedstock. This increase in pressure may be carried through the succeeding stages up to the make-up gas compression wherein the make-up gas is compressed to the synthesis pressure. Thus the make-up compressor inlet pressure will be greater when using a methane feedstock than when using a naphtha feedstock.

Consequently, although the volume of gas that has to be compressed by the make-up gas compressor to the synthesis pressure is increased by about 5% when using a methane feedstock, because the make-up gas compressor inlet pressure is greater, the increase in power required for the make-up gas compression to the ammonia synthesis pressure may be significantly less than 5%. On the other hand, because of the higher primary reformer outlet pressure, the pressure of the air fed to the secondary reformer may have to be somewhat greater: coupled with the increase in the amount of air employed, this results in an increase in the power required for air compression. However the overall effect is that the fuel saving generally more than outweighs any increase in the overall power requirements.

The above example assumed that the steam ratio was the same in each case and that the make-up gas produced in Case A was stoichiometric, i.e. had a hydrogen to nitrogen molar ratio of 3. In a more practical situation, the naphtha case A will employ an additional amount of air so that the make-up gas, after shift, has a hydrogen to nitrogen molar ratio of, typically, 2.8 or less, in order that a hydrogen recovery unit can be employed on the loop purge. If the process is operated with a hydrogen usage efficiency of 98%, i.e. so that 5266×0.98 kg mol/h to hydrogen are converted to ammonia, and a make-up gas hydrogen to nitrogen molar ratio of 2.8, the amount of make-up gas is increased to about 7215 kg mol/h. [In fact the amount of make-up gas may differ slightly from this figure since the amount of methane present therein may differ: this change in amount of methane results from the need, in order to produce the same amount of hydrogen but using an additional amount of air, to increase slightly the amount of feedstock, and hence the reformer throughput; however the increase in methane resulting from the increase in the reformer throughput is at least in part offset by the fact that the use of the additional amount of air here gives a higher secondary reformer outlet temperature which will have the effect of decreasing the amount of methane in the secondary reformed gas. For the present purposes, however, it is assumed that there is no change in the amount of methane in the make-up gas].

In this modified Case A, the 7215 kg mol/h of make-up gas includes about 1881 kg mol/h of nitrogen of which about 160 kg mol/h is removed in the hydrogen recovery unit.

The two cases are compared in the following table in which flow rates are expressed in kg mol/h:

|  | Case A (mod) | Case B |
|---|---|---|
| Primary feed | | |
| x | 2.15 | 4 |
| $CH_x$ (kg mol/h) | 2126 | 1660 |
| $H_2O$ (kg mol/h) | 6378 | 4984 |
| Secondary air (kg mol/h) | 2381 | 2662 |
| Make-up gas | | |
| $H_2/N_2$ ratio | 2.8 | 2.5 |
| $H_2$ (kg mol/h) | 5266 | 5266 |
| $N_2$ (kg mol/h) | 1881 | 2103 |
| $CH_4$ (kg mol/h) | 68 | 64 |
| Total (kg mol/h) | 7215 | 7433 |
| Compression power requirements | | |
| Air (MW) | 7.8 | 8.7 |
| Fresh synthesis gas (MW) | 8.7 | 8.8 |
| Total (MW) | 16.5 | 17.5 |

It is seen that the amount of make-up gas that has to be compressed in Case B is about 3% more than that in the modified Case A. The make-up gas compression power requirements assume compression to a moderate synthesis pressure of the order of 80–85 bar abs: the power required in case B for the compression of the make-up synthesis gas to the synthesis pressure is only about 2% greater than in the modified case A because the lower throughput, and hence pressure drop, in the gas generation stages gives a higher inlet pressure to the make-up gas compressor. The amount of power required for compression of the air is about 12% more in case B than in the modified case A, giving a total power requirement, i.e. air compression plus make-up gas compression, of about 6% more in Case B than in the modified Case A. However the fuel saving in the primary reforming stage and the smaller amount of feedstock and steam required in case B more than outweighs this power requirement difference.

The above Example assumes that the primary reformer outlet pressure is the same in each case: however, because of the the decreased throughput when using a methane feedstock, particularly since the steam ratio can also be reduced, the pressure drop in the primary reformer can be significantly lower than when reforming naphtha. This means that if the primary reformer inlet pressure, rather than the outlet pressure, is fixed the make-up gas compressor inlet pressure can be even greater when using a methane feedstock; thus the make-up gas com compression power requirement may be significantly less than that quoted in the above table.

EXAMPLE 2

In the following calculated example, the sequence of steps is as follows:

The feedstock, together with a recycle hydrogen stream is fed to a desulphurisation unit comprising a hydro-desulphurisation catalyst bed followed by a bed of an absorbent for hydrogen sulphide. The resulting desulphurised feed together with steam is fed to a primary reformer containing an alkalised naphtha reforming catalyst as in Example 1. The primary reformed gas is fed to a secondary reformer to which is also fed air and further amount of steam. The secondary reformed gas is subjected to two stages of shift reaction and then the excess of steam is condensed and the carbon dioxide removed by a conventional "wet" process wherein the carbon dioxide is absorbed in a regenerable absorbent liquid. The carbon dioxide-depleted gas is then methanated over a nickel catalyst and cooled to condense steam therefrom. A little of the gases are "lost" by dissolution in the separated liquid phases. The gas stream is then compressed and a portion is used as the aforesaid recycle hydrogen stream added to the feedstock prior to hydro-desulphurisation. The remaining gas constitutes the make-up gas and is fed to an ammonia synthesis loop.

A recycled purge stream is added to the make-up gas and then the gas is dried by a molecular sieve drier. To the dried gas is then added a loop recycle of unreacted gas from the ammonia separator and a hydrogen-enriched stream from a cryogenic hydrogen recovery unit. The resulting gas mixture is then fed to a circulator wherein its pressure is brought up to the synthesis pressure. A purge stream is taken from the circulator outlet and the remaining gas, constituting the synthesis gas, is fed, after heating, to a synthesis reactor containing beds of an iron ammonia synthesis catalyst. The reacted gas from the synthesis reactor is cooled and fed to an ammonia separator where liquid ammonia is separated. The unreacted gas from the separator is bed back to the circulator inlet as aforesaid. A small amount of unreacted gases are entrained with the liquid ammonia and part of these entrained gases are subsequently separated for use as a fuel gas.

The purge stream is fed to an ammonia absorber to recover ammonia from the purge. The recovered ammonia is added to the separated liquid ammonia to form the product ammonia. Part of the ammonia-depleted purge is taken to regenerate the molecular sieve drier and then recycled as aforesaid by adding it to the make-up gas. The rest of the ammonia-depleted purge stream is fed to the cold-box of the hydrogen recovery unit. In the hydrogen recovery unit the feed thereto is separated cryogenically into a waste gas stream at low pressure and a hydrogen-enriched gas stream substantially at the circulator inlet pressure. The waste gas stream is used as part of the fuel combusted to heat the primary reformer.

In this example, a naphtha containing about 40 mol % of aromatic hydrocarbons and having a composition corresponding to about $CH_{1.83}$ is used as the naphtha feedstock and, as the methane feedstock, natural gas containing about 65 mol % methane and such proportion of $C_2$ to $C_4$ saturated hydrocarbons that the hydrocarbon composition corresponds to about $CH_{3.24}$. The natural gas also contains a small proportion of carbon dioxide and nitrogen.

When using the naphtha feed, the reforming conditions are such that the hydrogen to nitrogen molar ratio after shift is about 2.6 and the synthesis loop is operated such that the synthesis gas entering the synthesis reactor has a hydrogen to nitrogen molar ratio of 3. When using the natural gas feed, the reforming conditions are such that the hydrogen to nitrogen molar ratio after shift is about 2.5 and the synthesis loop is operated such that the hydrogen to nitrogen ratio of the synthesis gas entering the synthesis reactor is about 2.2. By the use of these conditions, the volume of gas entering the synthesis reactor is only about 1% more when using the natural gas feedstock than when using the naphtha feedstock.

The flow rates for a plant exporting about 1350 te/day of ammonia are shown in the following tables.

In both cases the hydrogen usage efficiency is about 98%.

In this example, as in Example 1, the steam ratio is 3 with both the naphtha and natural gas feeds. As mentioned hereinbefore, it may be necessary to operate the naphtha reforming at a higher steam ratio than 3, for example at about 3.5. Also it is possible to operate the natural gas reforming at a lower steam ratio, for example 2.7. Changing the steam ratios has the effect of modifying the gas compositions somewhat but, more importantly, significantly reduces the amount of process steam required when the feedstock is natural gas relative to the amount required when the feedstock is naphtha. This reduction in the amount of process steam effects a further significant reduction on the throughput, and hence pressure drop and hence make-up gas compression power requirement.

| Natural gas feedstock Make-up gas generation | | | | | | | |
|---|---|---|---|---|---|---|---|
| Primary reformer exit temperature | | | | 776° C. | | | |
| Primary reformer exit pressure | | | | 35.5 bar abs. | | | |
| Secondary reformer exit temperature | | | | 919° C. | | | |
| | flow rates (kg mol/h) | | | | | | |
| | $CH_4$ | CO | $CO_2$ | $H_2$ | $H_2O$ | $N_2$ | Ar |
| primary in | 1850* | 10 | 58 | 5575 | | 27 | |
| primary out | 778 | 456 | 626 | 3189 | 3887 | 27 | |
| secondary in** | 778 | 456 | 627 | 3189 | 4292 | 2138 | 26 |
| secondary out | 80 | 1012 | 769 | 4292 | 4585 | 2138 | 26 |
| shift outlet | 80 | 35 | 1746 | 5269 | 3608 | 2138 | 26 |
| gas losses | | | | | 22 | 10 | 1 |
| ex-methanation | 122 | | | 5109 | 83 | 2128 | 25 |
| recycle $H_2$ | 1 | | | 57 | | 24 | |
| make-up gas | 121 | | | 5052 | | 2104 | 25 |

*$CH_{3.24}$ rather than $CH_4$.
**The air fed to the secondary includes 566.5 kg mol/h of oxygen.

| Synthesis loop | | | | | | |
|---|---|---|---|---|---|---|
| Synthesis reactor pressure | | | | 89 bar abs | | |
| Synthesis outlet temperature | | | | 410° C. | | |
| | flow rates (kg mol/h) | | | | | |
| | $CH_4$ | $H_2$ | $N_2$ | Ar | $NH_3$ | Total |
| make-up gas | 121 | 5052 | 2104 | 25 | | 7302 |
| recycled purge | 49 | 525 | 239 | 12 | | 825 |
| $H_2$ rich gas | 4 | 1191 | 136 | 4 | | 1335 |
| loop recycle | 1948 | 16071 | 7907 | 465 | 1303 | 27694 |
| purge | 170 | 1826 | 830 | 40 | 104 | 2970 |
| synthesis inlet | 1952 | 21013 | 9556 | 466 | 1199 | 34186 |
| synthesis outlet | 1952 | 16078 | 7911 | 466 | 4489 | 30896 |
| liquid $NH_3$ | 2 | 2 | 1 | | 3184 | 3189 |
| $NH_3$ from purge | | | | | 104 | 104 |
| lost as fuel gas | 2 | 5 | 3 | 1 | 2 | 13 |
| total $NH_3$ exported | 2 | 2 | 1 | | 3288 | 3293 |
| cold box inlet | 121 | 1301 | 591 | 28 | | 2041 |
| waste gas | 117 | 110 | 455 | 24 | | 706 |
| $H_2$ rich gas | 4 | 1191 | 136 | 4 | | 1335 |

| Naphtha feedstock Make-up gas generation | | | | | | | |
|---|---|---|---|---|---|---|---|
| Primary reformer exit temperature | | | | 800° C. | | | |
| Primary reformer exit pressure | | | | 39 bar abs. | | | |
| Secondary reformer exit temperature | | | | 952° C. | | | |
| | flow rates (kg mol/h) | | | | | | |
| | $CH_4$ | CO | $CO_2$ | $H_2$ | $H_2O$ | $N_2$ | Ar |
| primary in | 2223* | | | 39 | 6666 | 15 | |
| primary out | 634 | 689 | 900 | 3298 | 4177 | 15 | |
| secondary in** | 634 | 689 | 900 | 3298 | 4578 | 2041 | 25 |
| secondary out | 40 | 1213 | 970 | 4063 | 5001 | 2041 | 25 |
| shift outlet | 40 | 36 | 2147 | 5240 | 3824 | 2041 | 25 |
| gas losses | | | | | 22 | 10 | 1 |
| ex-methanation | 83 | | | 5080 | 82 | 2031 | 24 |
| recycle $H_2$ | 1 | | | 39 | | 15 | |
| make-up gas | 82 | | | 5041 | 24 | 2016 | 24 |

*$CH_{1.83}$ rather than $CH_4$.
**The air fed to the secondary includes 543.5 kg mol/h of oxygen.

| Synthesis loop | | | | | | |
|---|---|---|---|---|---|---|
| Synthesis reactor inlet pressure | | | | 89 bar abs | | |
| Synthesis outlet temperature | | | | 416° C. | | |
| | flow rates (kg mol/h) | | | | | |
| | $CH_4$ | $H_2$ | $N_2$ | Ar | $NH_3$ | Total |
| make-up gas | 82 | 5041 | 2016 | 24 | | 7163 |
| recycled purge | 24 | 450 | 150 | 9 | | 633 |
| $H_2$ rich gas | 5 | 1545 | 180 | 6 | | 1736 |
| loop recycle | 1203 | 18287 | 6098 | 431 | 1235 | 27254 |
| purge | 108 | 2084 | 695 | 39 | 102 | 3028 |
| synthesis inlet | 1206 | 23239 | 7749 | 431 | 1133 | 33758 |
| synthesis outlet | 1206 | 18295 | 6101 | 431 | 4429 | 30462 |
| liquid $NH_3$ | 2 | 2 | 1 | | 3192 | 3197 |
| $NH_3$ from purge | | | | | 102 | 102 |
| lost as fuel gas | 1 | 6 | 2 | | 2 | 11 |
| total $NH_3$ exported | 2 | 2 | 1 | | 3294 | 3299 |
| cold box inlet | 84 | 1634 | 545 | 30 | | 2293 |
| waste gas | 79 | 89 | 365 | 24 | | 557 |
| $H_2$ rich gas | 5 | 1545 | 180 | 6 | | 1736 |

I claim:

1. A process for the production of ammonia including the following steps:

(a) primary catalytic steam reforming a hydrocarbon feedstock selected from methane and naphtha by passing the feedstock and steam over a steam reforming catalyst suitable for the reforming of naphtha disposed in externally heated tubes, the catalyst in at least the inlet part of the tubes being alkalised, whereby a primary reformed gas stream comprising hydrogen, carbon oxides, methane, and unreacted steam, is produced;

(b) secondary steam reforming wherein the primary reformed gas stream is partially combusted with air and the resultant hot gas mixture is passed over a secondary steam reforming catalyst under substantially adiabatic conditions to bring the mixture towards equilibrium,
thereby producing a secondary reformed gas stream containing hydrogen, carbon oxides, nitrogen, a decreased quantity of methane, argon, and unreacted steam;

(c) one or more stages of catalytic shift reaction wherein the secondary reformed gas stream is passed over a shift catalyst to convert carbon monoxide to carbon dioxide with the consequent production of a mole of hydrogen for each mole of carbon monoxide converted;

(d) removal of the carbon oxides and unreacted steam, thereby producing ammonia synthesis gas; and (e) synthesizing ammonia from said ammonia synthesis gas;

said process comprising changing the feedstock from the naphtha feedstock to the methane feedstock, or vice versa, by:

(i) changing said feedstock;

(ii) changing the amount of external heating to the reformer tubes so that the degree of external heating is less when using the methane feedstock than when using the naphtha feedstock,
whereby the primary reformer exit temperature is lower when using the methane feedstock than when using the naphtha feedstock;

(iii) changing the amount of air, expressed as moles of air per gram atom of carbon in the feedstock, fed to the secondary reformer, such that said amount of air is greater when using the methane feedstock than when using the naphtha feedstock, whereby the amount of nitrogen introduced is such that the hydrogen to nitrogen molar ratio of the shifted gas stream is lower when using the methane feedstock than when using the naphtha feedstock and, at least when using the methane feedstock, said amount of nitrogen is in an excess of that required for ammonia synthesis; and (iv) at least when using methane as the feedstock, separating the excess of nitrogen after the shift stage.

2. A process according to claim 1 wherein the changes are made gradually by operating, for a period of time on a mixture of the methane and naphtha feedstocks and the amounts of:

(a) primary reformer heating;
(b) air employed in the secondary reforming; and
(c) nitrogen separated;

are varied in step with the change in the composition of the feedstock.

3. A process according to claim 1 wherein the steam ratio, expressed as moles of steam per gram atom of carbon in the feedstock, is also changed so that the steam ratio of the feed to the primary reforming stage when using the methane feedstock is 10-30% lower than when using the naphtha feedstock.

4. A process according to claim 1 wherein the ammonia synthesis gas is fed to an ammonia synthesis loop wherein ammonia is synthesised in a synthesis reactor and the synthesised ammonia is separated from unreacted gas which, apart for a purge stream, is returned to the synthesis, and, at least when using the methane feedstock, said purge stream is subjected to a hydrogen-recovery process to separate said purge stream into a hydrogen-enriched stream which is returned to the synthesis and a waste gas stream, and at least when using the methane feedstock, said hydrogen recovery process effects the separation of the excess of nitrogen which is removed from said loop as part of said waste gas stream, said process including the step of changing the hydrogen to nitrogen molar ratio of the synthesis gas entering the synthesis reactor, by changing the amount of nitrogen removed by the hydrogen recovery unit, so that the hydrogen to nitrogen molar ratio of the synthesis gas entering the synthesis reactor is lower when using the methane feedstock than when using the naphtha feedstock.

5. A process according to claim 1 wherein the primary reformed gas stream of step (b) together with an additional amount of at least one of feedstock and steam, is partially combusted with air.

6. A process according to claim 1 wherein the secondary reformed gas stream of step (c), together with a further quantity of steam, is passed over a shift catalyst.

7. A process according to claim 1 wherein the primary reformer outlet temperature is in the range 780°-830° C. when reforming the naphtha feedstock and is 10°-50° C. lower when reforming the methane feedstock.

8. A process according to claim 1 wherein, when using the naphtha feedstock, the methane content, M, of the primary reformed gas is in the range 5-15% v/v on a dry basis, and, when reforming the methane feedstock, is at least (M+2) %, and within the range 10-20%, v/v on a dry basis.

9. A process according to claim 1 wherein, when using the methane feedstock, the amount of air employed in the secondary reforming stage is such that the hydrogen to nitrogen molar ratio of the ammonia synthesis gas, after shift and before nitrogen separation, is in the range 2.2 to 2.8.

10. A process according to claim 4 wherein, when using the methane feedstock, they hydrogen to nitrogen ratio of the synthesis gas entering the synthesis reactor is in the range 1.8 to 2.5.

* * * * *